(12) United States Patent
Oki et al.

(10) Patent No.: US 11,984,732 B2
(45) Date of Patent: *May 14, 2024

(54) CONTACTLESS ELECTRIC POWER SUPPLY DEVICE

(71) Applicant: FUJI CORPORATION, Chiryu (JP)

(72) Inventors: Masayuki Oki, Kosai (JP); Shinji Takikawa, Nagoya (JP); Takeshi Nomura, Chiryu (JP)

(73) Assignee: FUJI CORPORATION, Chiryu (JP)

( * ) Notice: Subject to any disclaimer, the term of this patent is extended or adjusted under 35 U.S.C. 154(b) by 853 days.

This patent is subject to a terminal disclaimer.

(21) Appl. No.: 15/779,204

(22) PCT Filed: Dec. 1, 2015

(86) PCT No.: PCT/JP2015/083756
§ 371 (c)(1),
(2) Date: May 25, 2020

(87) PCT Pub. No.: WO2017/094119
PCT Pub. Date: Jun. 8, 2017

(65) Prior Publication Data
US 2021/0012955 A1  Jan. 14, 2021

(51) Int. Cl.
*H02J 50/12* (2016.01)
*B60L 53/122* (2019.01)
(Continued)

(52) U.S. Cl.
CPC ............ *H02J 50/12* (2016.02); *B60L 53/122* (2019.02); *B60L 53/126* (2019.02); *H01F 38/14* (2013.01);
(Continued)

(58) Field of Classification Search
CPC ....................................................... H01F 38/14
See application file for complete search history.

(56) References Cited

U.S. PATENT DOCUMENTS 3,581,071 A * 5/1971 Payseure .............. G01B 11/043
702/158
2011/0031047 A1  2/2011 Tarr
(Continued)

FOREIGN PATENT DOCUMENTS

CN    103620908 A    3/2014
JP    7-322535 A    12/1995
(Continued)

OTHER PUBLICATIONS

International Search Report dated Feb. 23, 2016, in PCT/JP2015/083756 filed Dec. 1, 2015.
(Continued)

*Primary Examiner* — Daniel Kessie
(74) *Attorney, Agent, or Firm* — Oblon, McClelland, Maier & Neustadt, L.L.P.

(57) ABSTRACT

A contactless electric power supply device of the present invention is provided with: multiple supply coils and an alternating current power source arranged on a fixed section; multiple receiving coils and a receiving circuit provided on a moving body; and a face-to-face power supply section provided for each of the multiple supply coils and configured to supply alternating current power from the alternating current power source to the supply coils only when detecting a face-to-face state between the supply coil and the receiving coil; wherein separation distances and lengths in the moving direction of the multiple supply coils and multiple receiving coils are set to satisfy face-to-face conditions, and a receiving circuit converts alternating current power received by at least one of the receiving coils in the face-to-face state and generates a receiving voltage at least equal to a driving voltage.

8 Claims, 6 Drawing Sheets

(51) Int. Cl.
  *B60L 53/126* (2019.01)
  *H01F 38/14* (2006.01)
  *H02J 50/40* (2016.01)
  *H02J 50/80* (2016.01)
  *H02J 50/90* (2016.01)

(52) U.S. Cl.
  CPC ............ *H02J 50/402* (2020.01); *H02J 50/80* (2016.02); *H02J 50/90* (2016.02)

(56) References Cited

U.S. PATENT DOCUMENTS

| | | | |
|---|---|---|---|
| 2013/0154556 A1 | 6/2013 | Takahashi et al. | |
| 2013/0220756 A1* | 8/2013 | Jindo | F16C 29/005 191/10 |
| 2014/0028091 A1* | 1/2014 | Yoshimura | B60L 9/12 307/9.1 |
| 2014/0116831 A1* | 5/2014 | Woronowicz | H02J 50/40 191/10 |
| 2014/0217957 A1* | 8/2014 | Mack | H02J 7/00036 320/108 |

FOREIGN PATENT DOCUMENTS

| | | |
|---|---|---|
| JP | 9-93841 A | 4/1997 |
| JP | 9-289702 A | 11/1997 |
| JP | 2002-137659 | 5/2002 |
| JP | 2009-284695 | 12/2009 |
| JP | 2012-85404 A | 4/2012 |
| JP | 2013-98499 A | 5/2013 |
| JP | 2013-153640 A | 8/2013 |
| JP | 2014-147160 A | 8/2014 |

OTHER PUBLICATIONS

Extended Search Report dated Nov. 19, 2018 in European Patent Application No. 15909749.2, 14 pages.

\* cited by examiner

CONTACTLESS ELECTRIC POWER SUPPLY DEVICE

TECHNICAL FIELD

The present application relates to a contactless electric power supply device that supplies electric power to a moving body from a fixed section in a contactless manner.

BACKGROUND ART

Board producing machines such as solder printers, component mounters, reflow ovens, and board inspection machines are used to produce boards mounted with many components. Conventionally, this equipment is connected to form a board production line. Further, in many cases, board productions lines are configured from multiple board production machines of the same size and in modular form lined up. By using board work machines in modular form, it is easy to perform changeover work when rearranging the line, or add equipment to increase the scale of the line, resulting in a flexible board production line.

To date, investigations have been performed into how to reduce energy consumption and automate work of conveying units and materials used in each board production machine of a board production line via a moving body that moves along the board production line. Further, as a method for supplying electric power to the moving body, a contactless electric power supply device has been considered. Note that, usage of a contactless electric power supply device is not limited to a board production line, and may be applied to a wide range of fields, such as assembly lines or processing lines for producing other products, and for supplying electric power to electric vehicles that are moving. Technological examples of contactless electric power supply devices of this type are disclosed in patent literature 1 to 3.

The contactless electric power supply system for a supplying electric power to something that is moving of patent literature 1 is provided with multiple primary-side electric power supply transformers (electric power supply elements) provided along a traveling path of a moving body, and a secondary-side electric power supply transformer (electric power receiving element) provided on the moving body. The primary-side electric power supply transformers and the secondary-side electric power supply transformers form a two-sided coil in which wires are coiled between magnetic poles of a core. When a magnetic pole dimension is D, the two primary-side electric power supply transformers are set with a gap between them in a range such that the gap separating the centers of the magnetic poles does not exceed 3D. Further, in an embodiment, a form is disclosed in which a rectifier circuit, a charging circuit, and a power storage element are provided on a latter part of the secondary-side electric power supply transformer. According to this, because the primary-side electric power supply transformers can be arranged like stepping stones, it is easy to perform setup work, and a long electric power supply region can be maintained with few primary-side electric power supply transformers.

The electric power supply system disclosed in patent literature 2 includes an electric power supply device provided with a high-frequency power source and a power-supply-use resonance coil, and an electric power receiving device provided with an power-receiving-use resonance coil, a power-receiving-use coil, a rectifier circuit, a DC-DC converter, and a battery. Accordingly, it is possible to supply electric power without considering changes in the input impedance at the electric power receiving device, and high electric power supply efficiency is achieved without dynamically changing the electric power supply conditions.

With the direct-mechanism-use contactless electric power supply device of patent literature 3, multiple primary-side transformer units (electric power supply elements) are arranged at intervals along the entire movement range of a moving body, and these primary-side transformer units are each connected in parallel to a high-frequency inverter via switches, and a secondary-side transformer unit (electric power receiving element) is attached to the moving body. In an embodiment, a position detecting means for closing the switch when it is detected that the moving body is close is disclosed. Accordingly, whichever position the moving body is at, at least one primary-side transformer unit facing the secondary-side transformer unit is excited, such that electric power can be supplied to the moving body.

CITATION LIST

Patent Literature

Patent literature 1: JP-A-2014-147160
Patent literature 2: JP-A-2013-153640
Patent literature 1: JP-A-H7-322535

BRIEF SUMMARY

Technical Problem

However, with the technology of patent literature 1 and patent literature 2, the power supplied in a contactless manner changes depending on the position of the moving body. Therefore, it is necessary to provide a charging circuit and a battery (electric power storage element) on the moving body side in accordance with the reduction to the electric power supply. Thus, the moving body is made larger and heavier, which means that a large driving force is required for movement. In particular, with a configuration in which an electric power driving source that generates a driving force is loaded on the moving body, because the electric power receiving element must be made large to increase the electric power force, the moving body becomes even larger and heavier.

The technology of patent literature 3 is advantageous in that a charging circuit and a battery are not required on the moving body side. However, with patent literature 3, because a large secondary-side transformer unit (electric power receiving element) corresponding to three primary-side transformer units (electric power supply elements) is provided on the moving body, the moving body is large and heavy. To put the above problems in other way, to make the driving force small by making the moving body small and light, it is necessary to make the charging circuit and battery unnecessary, and make the electric power receiving element small.

The present disclosure takes account of the problems in the above background art, and an object of the disclosure is to provide a contactless electric power supply device with a small and light moving body provided with an electric power receiving element that is smaller than the electric power supply element.

Solution to Problem

To solve the above problems, a contactless electric power supply device of the present disclosure includes: multiple electric power supply elements arranged separated from each other along a moving direction and set on a fixed section; an alternating current power source configured to supply an alternating current individually to the multiple electric power supply elements; multiple electric power receiving elements being provided on a moving body configured to move along the moving direction, arranged separated from each other along the moving direction, and configured to receive the alternating current in a contactless manner by being electrically coupled with one of the multiple electric power supply elements that is positioned facing one of the electric power receiving elements; a receiving circuit configured to convert the alternating current received by the multiple electric power receiving elements, generate a receiving voltage, and output the receiving voltage to an electric load provided on the moving body; and a face-to-face-power supply section being provided for each of the multiple electric power supply elements, and configured to detect a face-to-face state in which an entire length in the moving direction of at least one of the electric power receiving elements is within a range of a length in the moving direction of the electric power supply element, and supply the alternating current to the electric power supply element from the alternating current power source only when the face-to-face state is being detected, wherein a length in the moving direction of the multiple electric power supply elements and a distance by which the multiple electric power supply elements are separated from each other, and a length in the moving direction of the multiple electric power receiving elements and a distance by which the multiple electric power receiving elements are separated from each other are set such that face-to-face conditions, in which the face-to-face state is always occurring for the electric power supply element and at least one of the electric power receiving elements, are satisfied, and the receiving circuit is configured to convert the alternating current received by the at least one electric power receiving element that is in the face-to-face state, and generate receiving voltage at least equal to a driving voltage required to drive the electric load.

Advantageous Effects

With a contactless electric power supply device of the present disclosure, the moving body is provided with multiple electric power receiving elements that are smaller than the electric power supply element, and the electric power supply element and at least one of the electric power receiving elements are always in a face-to-face state regardless of the position of the moving body. Also, alternating current electric power is supplied from an alternating current power source to electric power supply element in a face-to-face state, and the electric power receiving element in the face-to-face state generates receiving voltage at least equal to the driving voltage from the received alternating current power, and supplies the receiving voltage to the electric load. By this, the electric load always operates stably. Accordingly, a small and light moving body is realized due to an electric power receiving element smaller than the electric power supply element being provided on the moving body, and a charging circuit and battery that are required for a conventional moving body not being necessary.

DESCRIPTION OF EMBODIMENTS

Figure 1:
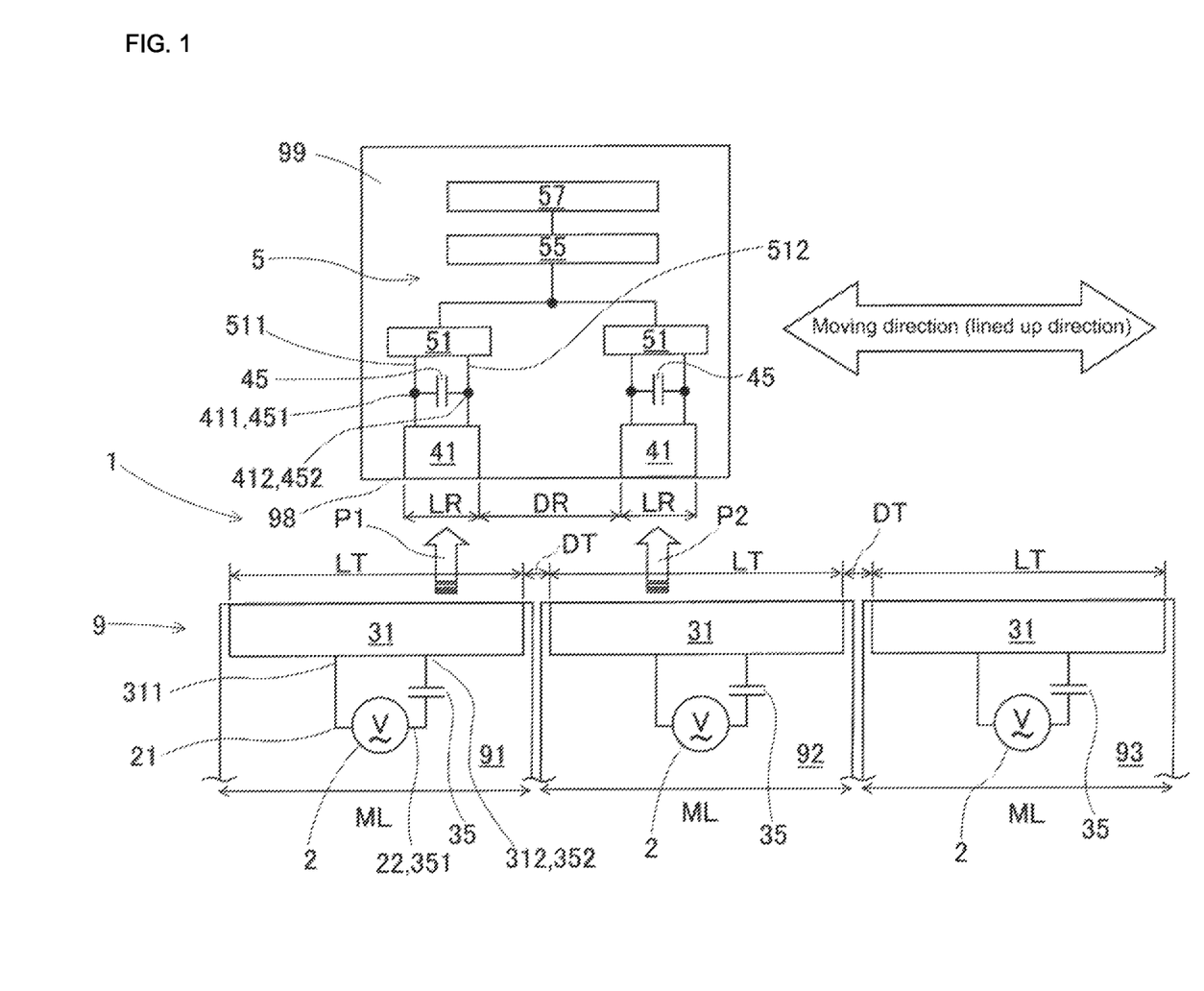
FIG. 1 schematically illustrates the configuration of a contactless electric power supply device of a first embodiment.

1. Configuration of Contactless Electric Power Supply Device 1 of a First Embodiment Contactless electric power supply device 1 according to a first embodiment of the present embodiment will be described with reference to FIGS. 1 to 11. FIG. 1 schematically illustrates the configuration of contactless electric power supply device 1 of a first embodiment. Contactless electric power supply device 1 of a first embodiment is assembled on board production line 9 that corresponds to a fixed section. As shown in FIG. 1, board production line 9 is configured from three machines, first to third board production machines 91, 92, and 93, which are arranged in a line. The left-right direction in FIG. 1 is the arrangement direction of the first to three board production machines 91, 92, and 93, and is the moving direction of moving body 99, which is described later.

Each board production machine 91, 92, and 93 is modularized, and they have the same width dimension ML in the arrangement direction. The first to third production machines 91, 92, and 93 can be rearranged and exchanged with other modularized board production machines. The quantity of board production machines that configures board production line 9 may be four or more, and it is possible to increase the arrangement quantity by increasing the quantity of modules later. Component mounters are a non-limiting example of first to third board production machines 91, 92, and 93.

A guide rail, which is not shown, that extends in the arrangement direction is provided at the front of first to third production machines 91, 92, and 93. Moving body 99 moves in the movement direction along the guide rail (in the arrangement direction of first to third board production machines 91, 92, and 93). Moving body 99 conveys units or materials used at board production machines 91, 92, and 93 from a storage unit, which is not shown, and returns the units or materials to the storage unit after use.

Contactless electric power supply device of a first embodiment is for performing contactless electric power supply to moving body 99 from first to third board production machines 91, 92, and 93. With contactless electric power supply device 1, first to third board production machine 91, 92, and 93 are each provided with alternating current power source 2, supply coil 31, and supply side capacitor 35. Also, with contactless electric power supply device 1, moving body 99 is provided with two receiving coils 41, two receiving side capacitors 45, and receiving circuit 5. Further, contactless electric power supply device 1 is provided with face-to-face power supply section 6 provided for each supply coil 31.

Because the configuration of contactless electric power supply device 1 of the three board production machines 91, 92, and 93 and of other modularized board production machines is the same, hereinafter detailed descriptions are given with respect reference symbols referring to the first board production machine 91. Alternating current power source 2 operates and supplies alternating current voltage to supply coil 31 when power source switches 23L and 23R (refer to FIG. 3) are turned on, and alternating current power source 2 stops when power source switches 23L and 23R are turned off. The turning on and off of power source switches 23L and 23R is performed based on sensors 61L, 61R, 62L, and 62R (refer to FIGS. 3 and 4), which are described later. The total of three alternating current power sources 2 provided on the three board production machines 91, 92, and 93 are able to operate independently from each other. It desirable to set the frequency of the alternating current voltage based on the resonance frequency of the receiving side resonance circuit and the supply side resonance circuit, which are described later.

Alternating current power source 2, for example, may be configured using a direct current power source section that supplies direction current voltage, and a well-known bridge circuit that converts direct current voltage into alternating current. Alternating current power source 2 may be equipped with functions for adjusting a voltage value, a frequency, a phase, or the like. First output element 21 of alternating current power source 2 is directly connected to end 311 of supply coil 31; second output element of alternating current power source 2 is connected to end 351 of supply side capacitor 35.

Supply coil 31 is an example of an electric power supply element. Supply coil 31 is provided on the front of each board production machine 91, 92, and 93, and is formed to be symmetrical to the front and rear in the conveyance direction. Supply side capacitor 35 is a resonance element that forms a supply side resonance circuit connected in series to power coil 31. Other end 352 of supply side capacitor 35 is connected to other end 352 of supply coil 31. This forms a closed electric power supply circuit.

The two receiving coils 41 are arranged on side wall 98 of moving body 99 facing supply coil 31, and are separated from each other in the moving direction. Receiving coil 41 is an example of an electric power receiving element. Supply coil 31 and receiving coil 41, when arranged face-to-face, are electromagnetically coupled, generating mutual inductance, such that contactless electric power supply is enabled. The actual separation distance of supply coil 31 and receiving coil 41 may be smaller than the shown separation distance.

End 411 of receiving coil 41 is connected to end 451 of receiving side capacitor 45 and terminal 511 on the input side of rectifier circuit 51 configuring circuit 5. Other end 412 of receiving coil 41 is connected to other end 452 of receiving side capacitor 45 and other end 512 on the input side of rectifier circuit 51. Receiving side capacitor 45 is a resonance element that forms a receiving side resonance circuit connected in parallel to receiving coil 41.

Figure 2:
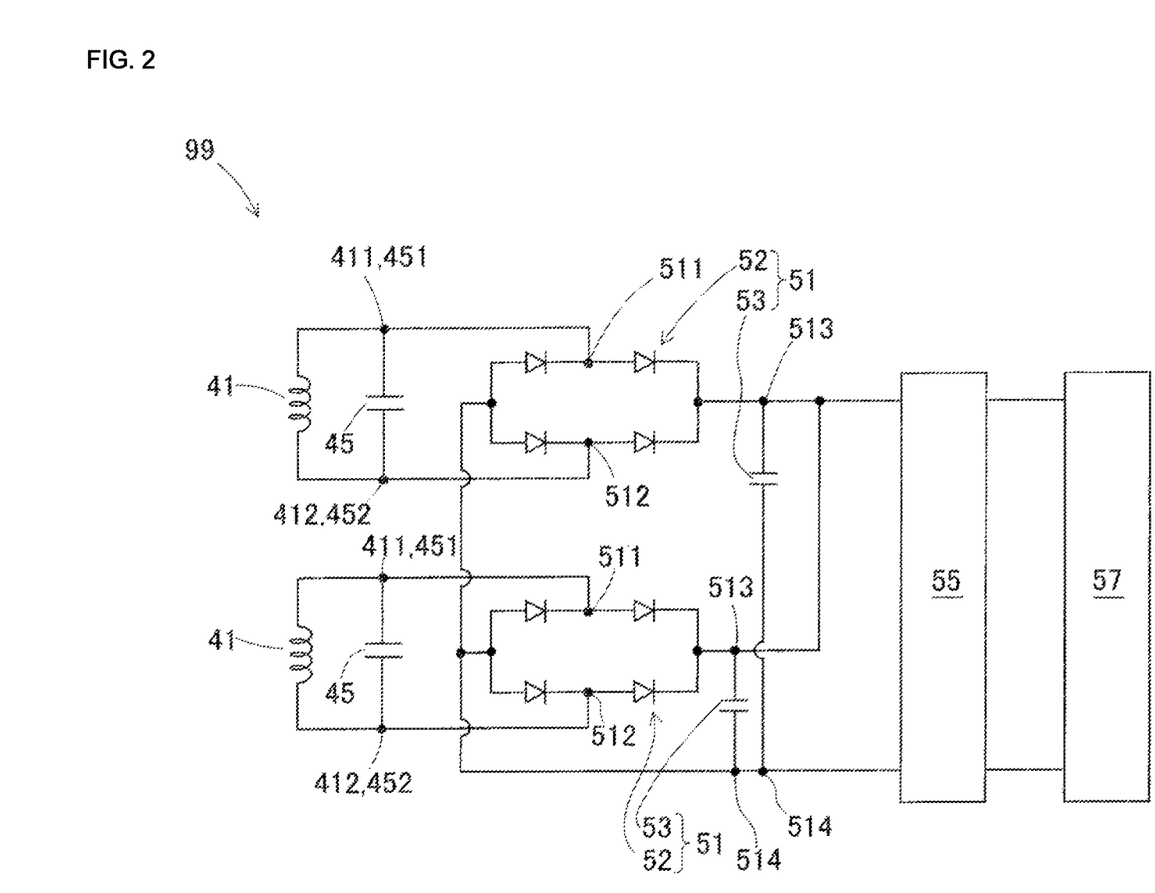
FIG. 2 is a circuit diagram showing the detailed circuit configuration on the moving body side of the contactless electric power supply device.

FIG. 2 is a circuit diagram showing the detailed circuit configuration on the moving body 99 side. As shown, receiving circuit 5 includes rectifier circuit 51 provided for each receiving coil 41, and direct current power source circuit 55 provided to be shared between two rectifier circuits 51. Rectifier circuit 51 is configured from full wave rectifier circuit 52 with four bridge-connected rectifier diodes, and smoothing capacitor 53 connected to the output side of full wave rectifier circuit 52. The two terminals, terminal 513 and other terminal 514, on the output side of rectifier circuit 51 are connected in parallel with respect to direct current power source circuit 55. The two rectifier circuits 51 convert the alternating current voltage received by each of the receiving coils 41 connected to the input side via contactless electric power supply into direct current receiving voltage and output the receiving voltage to direct current power source circuit 55.

Direct current power source circuit 55 includes driving voltage for stabilization. In other words, direct current power source circuit 55 adjusts the direct current receiving voltage output from rectifier circuit 51 that has an unstable voltage value to a direct current driving voltage that is substantially a fixed voltage, and supplies the driving voltage to electric load 57 loaded on moving body 99. Electric load 57 may include a moving-use driving source for moving body 99, for example, a linear motor. An example of direct current power source circuit 55 is a switching method or a dropper method DC-DC converter. Direct current power source circuit 55 may be equipped with a step down function and a step up function.

Described next is the length in the moving direction of supply coil 31 and receiving coil 41, the separation distance in the moving direction between adjacent supply coils 31 and receiving coils 41, and how the size of these affects operation. As shown in FIG. 1, the length of supply coil 31 in the moving direction is given as LT, and the separation distance between supply coils 31 is given as DT. Also, the length of receiving coil 41 in the moving direction is given as LR, and the separation distance between receiving coils 41 is given as DR. Length LT of supply coil 31 in the moving direction is slightly smaller than width dimension ML of board production machines 91, 92, and 93.

Here, the relationship DT≤DR is also true. Accordingly, two receiving coils 41 on the moving body 99 side cannot be face-to-face with the small separation distance DT on the board production line 9 side. Therefore, at least one of the receiving coils 41 must be in a face-to-face state of being face-to-face with supply coil 31 and outside of the range of separation distance DT. Here, "face-to-face state" means a state in which the entire length LR in the moving direction of receiving coil 41 is within the range of length LT in the moving direction of supply coil 31.

Also, the relationship (2×LR+DR)≤LT is true. Accordingly, a time period occurs in which the entire lengths LR in the moving direction of the two receiving coils 41 are face-to-face with the range of length LT in the moving direction of one supply coil 31. In other words, as moving body 99 moves, a state occurs in which two receiving coils 41 are face-to-face with one supply coil 31. The relationship DT≤DR and the relationship (2×LR+DR)≤LT satisfy the face-to-face conditions for achieving a situation in which supply coil 31 and at least one receiving coil 41 are always in a face-to-face state.

Specifically, with the positional relationship shown in FIG. 1, supply coil 31 of first board production machine 91 and left-side-in-the-figure receiving coil 41 are face-to-face, and supply coil 31 of second board production machine 92 and right-side-in-the-figure receiving coil 41 are face-to-face. Here, the two receiving coils 41 are in a favorable receiving state, and can received a large alternating current indicated by arrows P1 and P2. Then, the alternating current power received by the two receiving coils 41 is rectified in the respective rectifier circuits 51 and then added together in direct current power source circuit 55. Accordingly, a large direct current power supply corresponding to the direct current power received by the two receiving coils 41 can be supplied to electric load 57.

When moving body 99 is moved from the state shown in FIG. 1 to the right, right-side receiving coil 41 continues to be face-to-face with supply coil 31 of second board production machine 92. However, left-side receiving coil 41 is in a shifted-facing state that is no longer directly face-to-face with supply coil 31 of first board production machine 91. Here, a "shifted-facing state" means a positional relationship in which that only a portion of the length LR in the moving direction of receiving coil 41 is face-to-face with the range of length LT in the moving direction of supply coil 31.

Here, the direct current receiving voltage (output voltage of rectifier circuit 51) generated from the alternating current electric power received by the right-side receiving coil 41 that is in a face-to-face state is at least equal to the driving voltage that drives electric load 57. That is, electric load 57 operates stably even in a case in which left-side coil 41 is not receiving electric power at all due to being shifted from the front surface of supply coil 31, and direct current power source circuit 55 is not equipped with a step up function.

2. Configuration of Face-to-Face Power Supply Section 6

Figure 3:
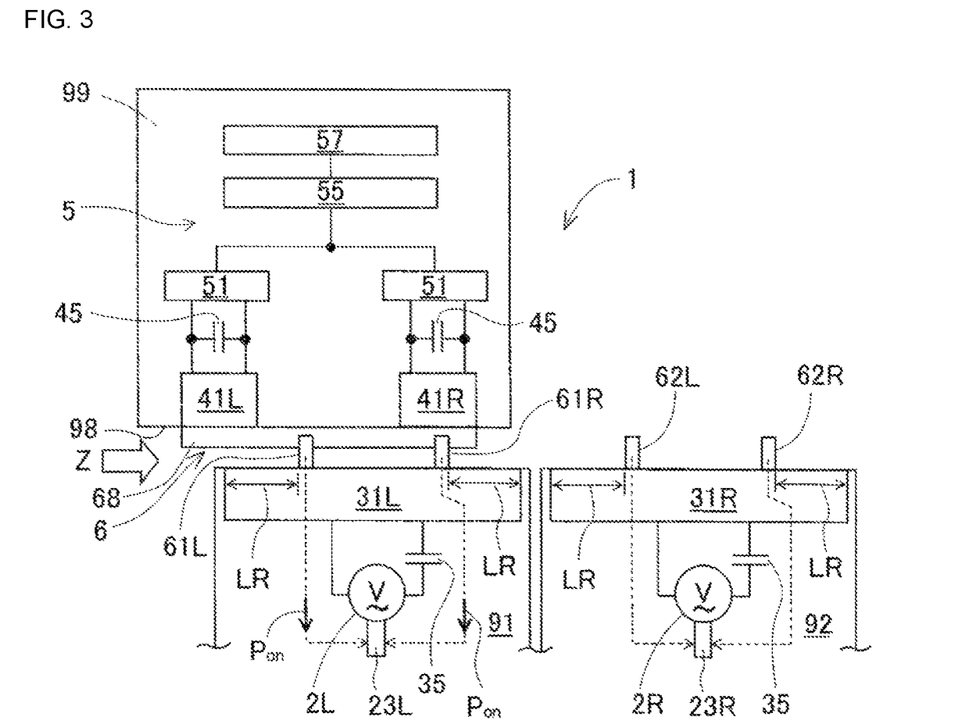
FIG. 3 schematically illustrates the configuration of a face-to-face power supply section.
Figure 4:
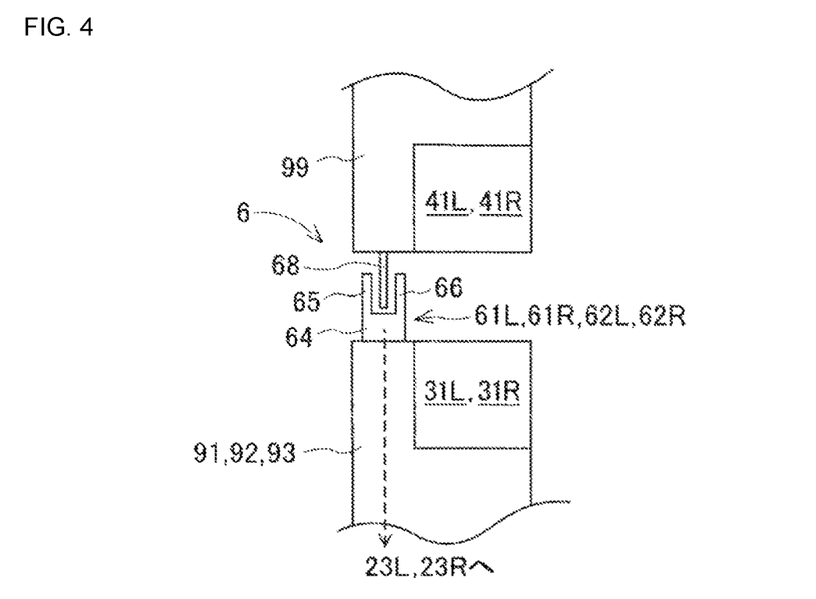
FIG. 4 is an enlarged partial side view seen from the Z direction of FIG. 3 that schematically illustrates the configuration of a face-to-face power supply section.

Next, the configuration of face-to-face power supply section 6, which is not shown in FIG. 1, is described. FIG. 3 schematically illustrates the configuration of face-to-face power supply section 6. Also, FIG. 4 is an enlarged partial side view seen from the Z direction of FIG. 3 that schematically illustrates the configuration of face-to-face power supply section 6. Face-to-face power supply section 6 is provided for each electric power supply 31 (31L and 31R) of each board production machine 91 to 93. Face-to-face power supply section 6 is configured from a face-to-face state detecting section configured from sensors 61L, 61R, 62L, and 62R, and dog 68, as well as power source switches 23L and 23R of alternating current power sources 2 (2L and 2R).

As shown in FIG. 3, two sensors 61L, 61R, 62L, and 62R are provided for each electric power supply element 31L and 31R. Sensors 61L, 61R, 62L, and 62R are arranged at positions shifted from the edges in the moving direction of supply coils 31L and 31R towards the center by the length LR in the moving direction of electric power receiving coils 41L and 41R. Dog 68 is a long, thin plate provided protruding from side surface 98 of moving body 99. Dog 68 extends to connect far ends of two electric power receiving coils 41L and 41R.

Sensors 61L, 61R, 62L, and 62R are sensors that detect light being blocked. Cheap general purpose sensors may be used for sensors 61L, 61R, 62L, and 62R. As shown in FIGS. 4, sensors 61L, 61R, 62L, and 62R are configured from main body section 64, light emitter 65, and light receiver 66. Light emitter 65 and light receiver 66 are provided protruding from main body section 64 separated from each other. Dog 68 is provided to be able to enter and exit the space between light emitter 65 and light receiver 66.

Light emitter 65 emits detection light towards light receiver 66. Light receiver 66 detects whether the detection light is being blocked or reaching the light receiver. When dog 68 enters between light emitter 65 and light receiver 66 (referred to hereinafter as "dog 68 entering the sensor"), the detection light is blocked. When dog 68 leaves the space between light emitter 65 and light receiver 66, the detection light reaches the receiver. Inside first board production machine 91, main body sections 64 of the two sensors, 61L and 61R, are each connected to power source switch 23L of alternating current power source 2L. Similarly, inside second board production machine 92, main body sections 64 of the two sensors, 62L and 62R, are each connected to power source switch 23R of alternating current power source 2R.

Dog 68, when receiving coil 41 (41L, 41R) is in a face-to-face state, enters sensors 61L, 61R, 62L, and 62R so as to activate sensors 61L, 61R, 62L, and 62R. In the specific example shown in FIG. 3, right-side receiving coil 41R is in a face-to-face state with supply coil 31L of first board production machine 91. Dog 68 is entered inside sensors 61L and 61R of first board production machine 91. By this, light receivers 66 of sensors 61L and 61R detect a light blocked state. Only during the period in which light receivers 66 are detecting a light blocked state, main body section 64 issues an instruction, turn on instruction Pon, to power source switch 23L. Only during the period during which at least one of the sensors 61L and 61R is generating the turn on instruction Pon, power source switch 23L is turned on, and alternating current power source 2L operates.

Also, dog 68 does not enter sensors 62L or 62R of second board production machine 92, so sensors 62L and 62R do not operate. Accordingly, with second board production machine 92, turn on instruction Pon is not issued to power source switch 23R, and alternating current power source 2R is stopped.

3. Operation of Contactless Electric Power Supply Device 1 of a First Embodiment Next, operation of contactless power supply device 1 of a first embodiment will be described. As an example of simple operation, it is assumed that moving body 99 moves at a fixed moving speed from the left end position in FIG. 3 in a direction to the right. In reality, moving body 99 is controlled to move at varying speeds and is able to stop at any given position in the moving direction. FIGS. 5 to 10 schematically show states over time as moving body 99 moves to the right in the figures. Further, FIG. 11 is a time chart showing states of alternating current power sources 2L and 2R and sensors 61L, 61R, 62L, and 62R of the first and second board production machines 91 and 92 that change in accordance with movement of moving body 99.

At time t1, moving body 99 is at the left end position in FIG. 3. At this time, dog 68 is entered inside sensors 61L and 61R of first board production machine 91. As shown in FIG. 11, with sensors 61L and 61R of first board production machine 91 in a blocked state, turn on instruction Pon is issued, and alternating current power source 2L operates. Accordingly, even if the receiving state of left side receiving coil 41L is not good, sufficient receiving voltage is achieved from right side receiving coil 41R that is in a face-to-face state, and electric load 57 operates stably. On the other hand, because dog 68 is not inserted, sensors 62L and 62R of second board production machine 92 are in a light receiving state, and alternating current power source 2R is stopped.

Figure 5:
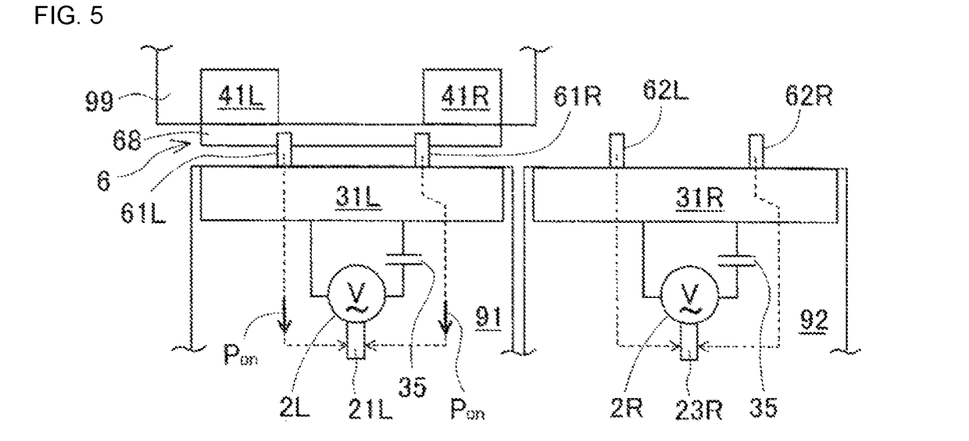
FIG. 5 shows the moving body moved to the right from the position shown in FIG. 3 to show a state in which two receiving coils are face-to-face with a first board production machine supply coil.

Moving body 99 moves from the left end position, and at time t2 has reached the position shown in FIG. 5. FIG. 5 shows a state in which receiving coils 41L and 41R are both in a face-to-face state with supply coil 31L of first board production machine 91. The situation of both being in a face-to-face state continues only for a short length of time, including time t2. Then, right side receiving coil 41R shifts to the right of supply coil 31L and the face-to-face state is lost. On the other hand, the face-to-face state of left side receiving coil 41L continues, so sufficient receiving voltage is maintained.

Figure 6:
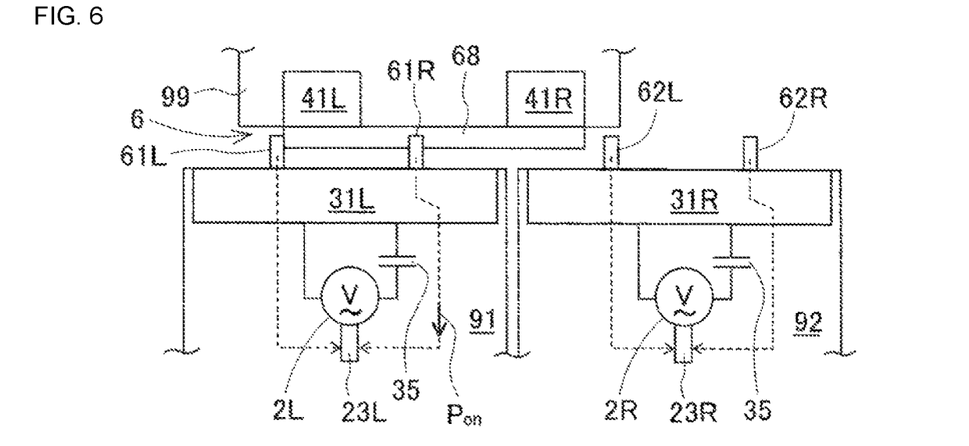
FIG. 6 shows the moving body moved to the right from the position shown in FIG. 5 to show a state in which the dog no longer causes the left-side sensor of the first broad production machine to operate.

Moving body 99 moves further, and at time t3 has reached the position shown in FIG. 6. FIG. 6 shows the moment that dog 68 stops causing left side sensor 61L of first board production machine 91 to operate. From time t3 onwards, the left end of dog 68 is beyond left side sensor 61L, so sensor 61L is in a light receiving state, and turn on instruction Pon is no longer issued (refer to FIG. 11). On the other hand, for right side sensor 61R, dog 68 maintains an inserted state. Accordingly, due to the turn on instruction Pon of right side sensor 61R, alternating current power source 2L continues operating. By this, sufficient receiving voltage is achieved from left side receiving coil 41L. Also, dog 68 is not causing left side sensor 62L of second board production machine 92 to operate, so alternating current power source 2R of second board production machine 92 does not operate.

Figure 7:
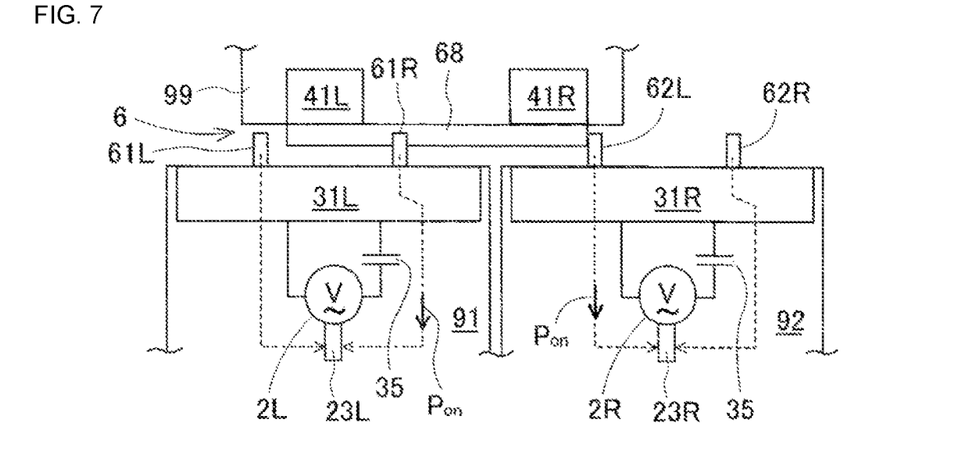
FIG. 7 shows the moving body moved to the right from the position shown in FIG. 6 to show the moment when the dog starts to cause the left-side sensor of the second broad production machine to operate.

Moving body 99 moves further, and at time t4 has reached the position shown in FIG. 7. FIG. 7 shows the moment that dog 68 starts causing left side sensor 62L of second board production machine 92 to operate. As shown, at the moment that the right end of dog 68 enters inside left side sensor 62L of second board production machine 92, left side sensor 62L is in a blocked state, so the turn on instruction Pon is issued. By this, alternating current power source 2R starts to operate (refer to FIG. 11). At the same time, right side receiving coil 41R is now in a face-to-face state with supply coil 31R of second board production machine 92, so sufficient receiving voltage is achieved. In addition, left side receiving coil 41L is also maintained in a face-to-face state with supply coil 31L, so sufficient receiving voltage is achieved.

Figure 8:
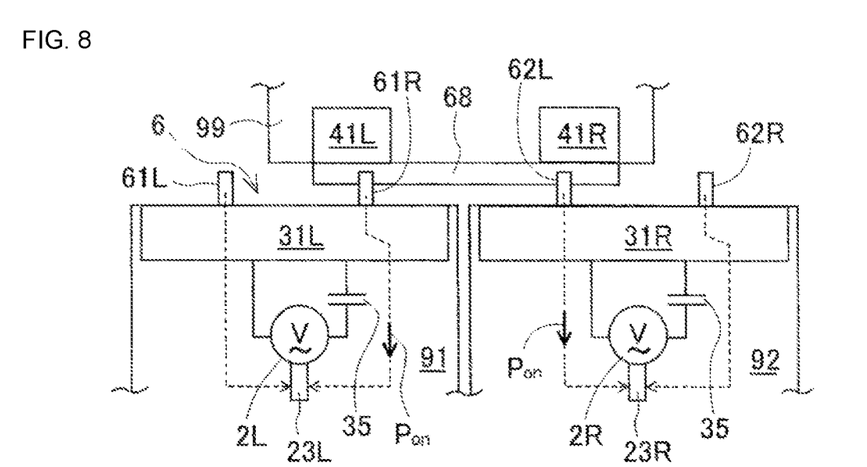
FIG. 8 shows the moving body moved to the right from the position shown in FIG. 7 to show a state in which the left side receiving coil is facing the supply coil of the first board production machine and the right side receiving coil is facing the supply coil of the second board production machine.

Moving body 99 moves further, and at time t5 has reached the position shown in FIG. 8. FIG. 8 shows the state when left side receiving coil 41L is face-to-face with supply coil 31L of first board production machine 91, and right side receiving coil 41R is face-to-face with supply coil 31R of second board production machine 92. In this state, sufficient receiving voltage is achieved from each of receiving coil 41L and 41R, which are both in a face-to-face state. The situation of both being in a face-to-face state continues for a relatively long length of time, including time t5.

Figure 9:
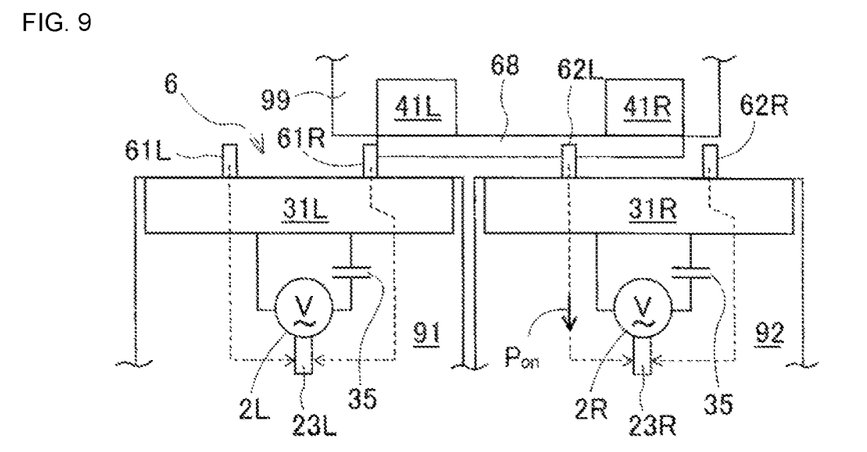
FIG. 9 shows the moving body moved to the right from the position shown in FIG. 8 to show a state in which the dog no longer causes the right-side sensor of the first broad production machine to operate, and the alternating current power source is stopped.

Moving body 99 moves further, and at time t6 has reached the position shown in FIG. 9. FIG. 9 shows the moment that dog 68 stops causing right side sensor 61R of first board production machine 91 to operate such that alternating current power source 2L stops. As shown, the left end of dog 68 exits from right side sensor 61R of first board production machine 91. The moment that dog 68 exits, right side sensor 61R is now in a light receiving state, so the turn on instruction Pon disappears, meaning that alternating current power source 2L stops. At the same time, left side receiving coil 41L shifts to the right of supply coil 31L and the face-to-face state is lost. On the other hand, right side receiving coil 41R is maintained in a face-to-face state with supply coil 31R, so sufficient receiving voltage is achieved.

Figure 10:
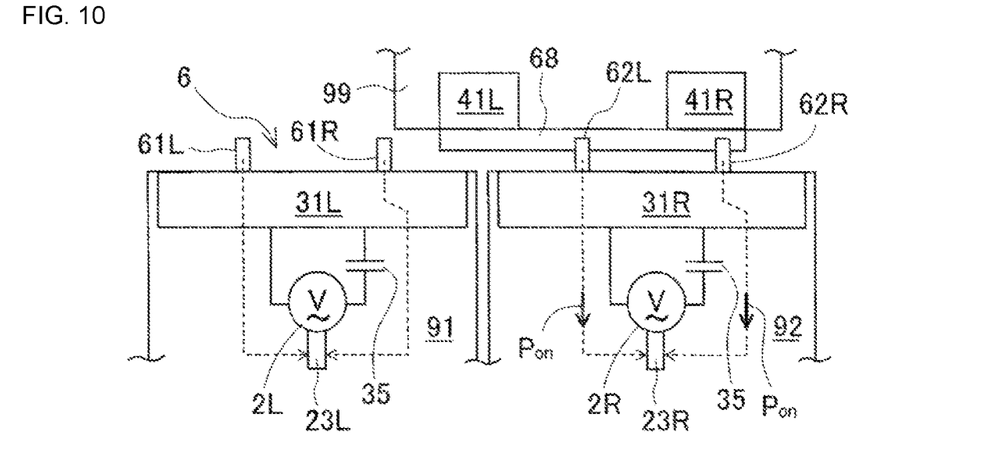
FIG. 10 shows the moving body moved to the right from the position shown in FIG. 9 to show a state in which the dog is causing both sensors of the second board production machine to operate, the right side receiving coil is facing the supply coil of the second board production machine and the left side receiving coil is shifted from a position facing two of the supply coils.
Figure 11:
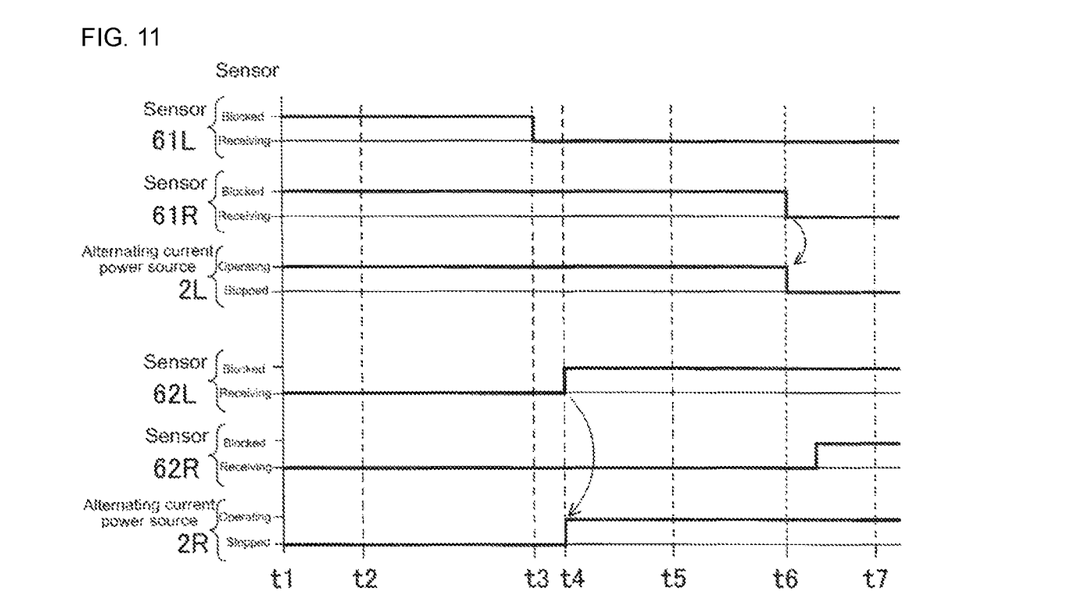
FIG. 11 is a time chart showing states of the alternating current power source and the sensors of the first and second board production machines that change in accordance with movement of the moving body.

Moving body 99 moves further, and at time t7 has reached the position shown in FIG. 10. FIG. 10 shows the state in which dog 68 causes both sensors 62L and 62R of second board production machine 92 to operate, right side receiving coil 41R is face-to-face with supply coil 31R of second board production machine 92, and left side receiving coil 41L is in a state shifted from being face-to-face with supply coils 31L and 31R. Between times t6 and t7 shown in FIG. 11, the right end of dog 68 enters inside right side sensor 62R, so sensor 62R is in a blocked state, meaning that the turn on instruction Pon is issued.

On the other hand, dog 68 has already exited from right side sensor 61R of first board production machine 91, so alternating current power source 2L is stopped. Accordingly, left side receiving coil 41L does not receive power from supply coil 31L of first board production, meaning that power supply from supply coil 31R of second board production machine 92 is not sufficient; however, right side receiving coil 41R maintains a face-to-face state with supply coil 31R, so sufficient receiving voltage is achieved. Accordingly, even if left side receiving coil 41L is not receiving any power, electric load 57 can operate stably.

In operations described above, alternating current power source 2R starts operation in a timely manner at time t4 the moment that receiving coil 31R becomes face-to-face with receiving coil 41R. Also, alternating current power source 2L stops in a timely manner at time t6 the moment that supply coil 31L is no longer face-to-face with receiving coil 41L. Accordingly, supply coils 31 (31L and 31R) in a face-to-face state ensure that alternating current power is always supplied, and are able to perform contactless electric power supply favorably. Further, supply coils 31 (31L and 31R) stop receiving alternating current power the moment that the face-to-face state ends. In other words, because alternating current power sources 2 (2L and 2R) only operate when supply coil 31 (31L, 31R) is in a face-to-face state, the power supply efficiency is high.

4. Forms and Effects of Contactless Electric Power Supply Device 1 of a First Embodiment Contactless electric power supply device 1 of the first embodiment includes: multiple supply coils 31 (31L and 31R) arranged separated from each other along a moving direction and set on a fixed section (board production line 9); alternating current power sources 2 (2L and 2R) configured to supply an alternating current individually to the multiple electric power supply elements; multiple receiving coils 41 (41L and 41R) being provided on moving body 99 configured to move along the moving direction, arranged separated from each other along the moving direction, and configured to receive the alternating current in a contactless manner by being electrically coupled with one of the multiple supply coils 31 (31L and 31R) that is positioned facing one of the electric power receiving elements; receiving circuit 5 configured to convert the alternating current received by the multiple receiving coils 41 (41L and 41R), generate a receiving voltage, and output the receiving voltage to electric load 57 provided on moving body 99; and face-to-face-power supply section 6 being provided for each of the multiple supply coils 31 (31L and 31R), and configured to detect a face-to-face state in which an entire length in the moving direction of at least one of the receiving coils 41 (41L and 41R) is within a range of length LT in the moving direction of the supply coils 31 (31L and 31R), and supply the alternating current to the supply coils 31 (31L and 31R) from the alternating current power source 2 (2L and 2R) only when the face-to-face state is being detected, wherein length LT in the moving direction of the multiple supply coils 31 (31L and 31R) and distance DT by which the multiple supply coils 31 (31L and 31R) are separated from each other, and length LR in the moving direction of the multiple receiving coils 41 (41L and 41R) and distance DR by which the multiple receiving coils 41 (41L and 41R) are separated from each other are set such that face-to-face conditions, in which the face-to-face state is always occurring for the supply coils 31 (31L and 31R) and at least one of the receiving coils 41 (41L or 41R), are satisfied, and receiving circuit 5 is configured to convert the alternating current received by the at least one receiving coil 41 (41L or 41R) that is in the face-to-face state, and generate receiving voltage at least equal to a driving voltage required to drive electric load 57.

With contactless electric power supply device 1 of the first embodiment, moving body 99 is provided with multiple receiving coils 41 (41L and 41R) that are smaller than supply coils 31 (31L and 31R), and the supply coil 31 (31L and 31R) and at least one of the receiving coils 41 (41L and 41R) are always in a face-to-face state regardless of the position of moving body 99. Also, alternating current electric power is supplied from alternating current power source 2 (2L and 2R) to supply coil 31 (31L and 31R) in a face-to-face state, and receiving coils 41 (41L and 41R) in the face-to-face state generate receiving voltage at least equal to the driving voltage from the received alternating current power, and supply the receiving voltage to electric load 57. Accordingly, electric load 57 always operates stably. Accordingly, small and light moving body 99 is realized due to receiving coils 41 (41L and 41R) smaller than supply coils 31 (31L and 31R) being provided on moving body 99, and a charging circuit and battery that are required for a conventional moving body not being necessary.

Further, with contactless electric power supply device 1 of the first embodiment, the face-to-face conditions are expressed as a relationship of DT DR, and a relationship of (2×LR+DR)≤LT. Accordingly, receiving coils 41L and 41R can be arranged in one of three states: a state face-to-face with the same supply coil, 31L; a state face-to-face with different supply coils, 31L and 31R respectively; or a state with one in a face-to-face state with supply coil 31R and the other shifted from a face-to-face state with supply coils 31L and 31R. Accordingly, contactless electric power supply device 1 can be designed and manufactured by setting the lengths LT and LR and separation distances DT and DR in the moving direction of supply coils 31 and receiving coils 41 based on the face-to-face conditions.

Further, face-to-face power supply section 6 includes power source switches 23L and 23R to turn on and off alternating current power source 2 (2L and 2R) provided for each supply coil 31 (31L and 31R), and a face-to-face state detecting section that turns on power source switches 23L and 23R only when the face-to-face state is detected. Thus, because alternating current power sources 2 (2L and 2R) only operate when supply coil 31 (31L, 31R) is in a face-to-face state, the power supply efficiency is high.

Further, face-to-face state detecting section includes sensors 61L, 61R, 62L, and 62R provided on the fixed section (board production line 9) corresponding to supply coils 31 (31L and 31R), and dog 68 provided on moving body 99 corresponding to the multiple receiving coils 41 (41L and 41R), wherein, dog 68 corresponding to the at least one receiving coil 41 (41L or 41R) in the face-to-face state causes sensors 61L, 61R, 62L, and 62R to operate. Accordingly, the face-to-face state detecting section can be configured from cheap, general-purpose sensors 61L, 61R, 62L, and 62R, contributing to low costs.

Further, sensors 61L, 61R, 62L, and 62R are arranged at positions shifted from the edges in the moving direction of supply coils 31 (31L and 31R) towards the center by the length LR in the moving direction of electric power receiving elements 41 (41L and 41R), and dog 68 extends connecting respective far ends of the multiple receiving coils 41 (41L and 41R) that are separated from each other. Accordingly, the occurrence and non-occurrence of the face-to-face state can be detected accurately, such that alternating current power source 2 (2L and 2R) can be turned on and off in a timely manner, greatly improving the power supply efficiency.

Further provided are a resonance circuit formed by supply-side capacitor 35 that is connected to supply coil 31 (31L and 31R), and a resonance circuit formed by receiver-side capacitor 45 that is connected to receiver coil 41 (41L and 41R), and receiving circuit 5 includes multiple rectifier circuits 51 provided for each of the receiving coils 41 (41L and 41R) and configured to convert received alternating current electric power into the direct current receiving voltage and output the direct current receiving voltage, and direct current power source circuit 55 configured to convert the direct current receiving voltage output by each of the rectifier circuits 51 into the direct driving voltage. Accordingly, it is possible to use the resonance characteristics to achieve highly efficient power supply. Also, even if the receiving voltage varies due to changes in the resonance characteristics caused by changes over time or temperature changes, thanks to the voltage stabilizing effect of direction current power source circuit 55, electric load 57 can always be operated stably.

Further, the receiving element is receiving coils 41 (41L and 41R), and the supply element is supply coil 31 (31L and 31R). Accordingly, it is possible to always achieve stable power supply in a contactless manner using contactless electric power supply device 1.

Also, the fixed section is board production line 9 in which multiple board production machines, 91 to 93, are arranged in a line, the moving direction is set in a direction in which the multiple board production machines 91 to 93 are lined up, and the multiple supply coils 31 (31L and 31R) are arranged in a quantity that is the same as the quantity of the multiple board production machines 91 to 93. Accordingly, in all cases of adding modules to the line such that the arrangement quantity is at least four, via changes to the arrangement order of the first to third board production machines 91, 92, and 93, or replacing machines with other modular board production machines, contactless electric power supply device 1 maintains a favorable receiving state. Accordingly, when the configuration of board production line 9 is changed, or when modules are added, changeover work related to contactless electric power supply device 1 is easy.

Figure 12:
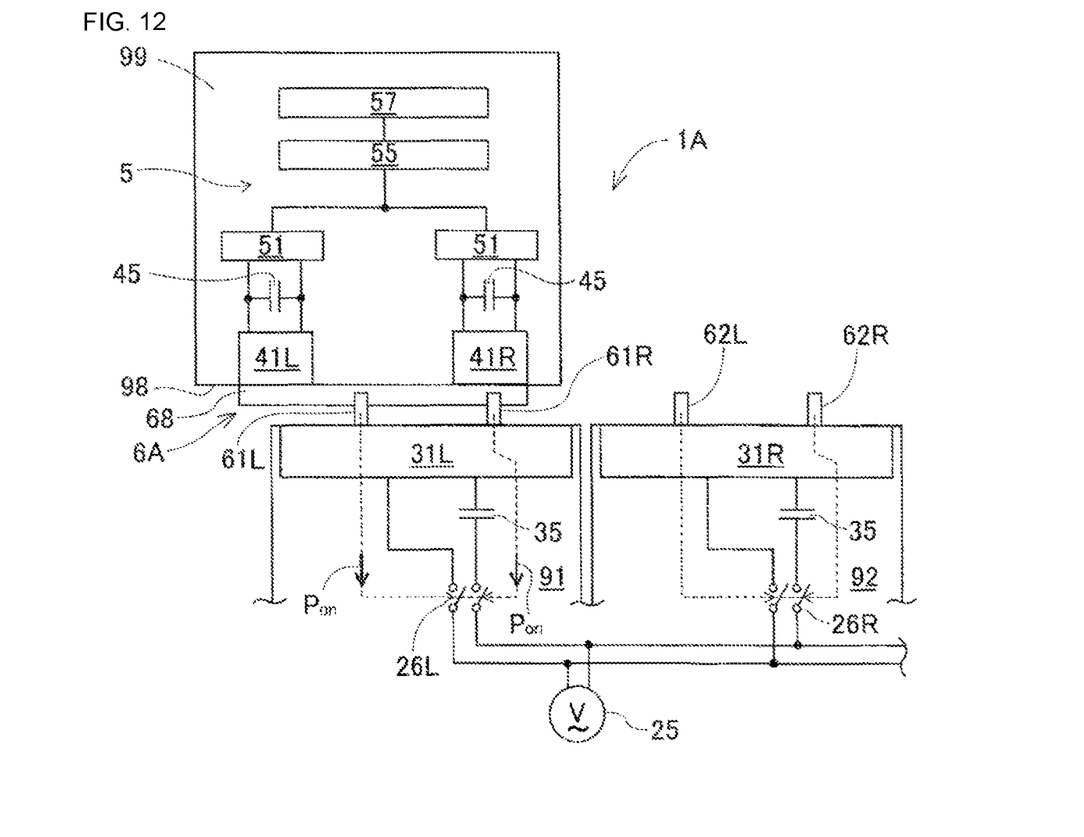
FIG. 12 schematically illustrates the configuration of a face-to-face power supply section and alternating current power source of a second embodiment.

5. Configuration of Contactless Electric Power Supply Device 1A of a Second Embodiment Contactless electric power supply device 1A of a second embodiment is described next, with descriptions focusing on differences with the first embodiment. In the second embodiment, the configurations of alternating current power source 25 and face-to-face power supply section 6A are different to the first embodiment, with other portions being the same as the first embodiment. FIG. 12 schematically illustrates the configuration of face-to-face power supply section 6A and alternating current power source 25 of the second embodiment.

As shown, alternating current power source 25 is provided for shared use with multiple electric power supply elements 31L and 31R. The power source capacity of alternating current power source 25 is larger than the power source capacity of alternating current power sources 2 (2L and 2R) of the first embodiment. Open and close switches 26L and 26R are respectively provided in the circuits that parallel connect alternating current power source 25 and electric power supply elements 31L and 31R. While contactless electric power supply device 1A is operating, alternating current power source 25 operates continuously.

As with the first embodiment, face-to-face power supply section 6A includes a face-to-face state detecting section, that is, sensors 61L, 61R, 62L, and 62R, and dog 68. Instead of power source switches 23L and 23R, face-to-face power supply section 6A includes open and close switches 26L and 26R. Inside first board production machine 91, main body sections 64 of the two sensors, 61L and 61R, are each connected to open and close switch 26L. Inside second board production machine 92, main body sections 64 of the two sensors, 62L and 62R, are each connected to open and close switch 26R. Further, only during the period in which light receivers 66 are detecting a light blocked state, main body section 64 issues an instruction, turn on instruction Pon, to open and close switches 26L and 26R. Only during the period during which at least one of the pair of sensors 61L and 61R, or one of the pair of sensors 62L and 62R, is generating the turn on instruction Pon, open and close switch 26L or 26R is in a closed circuit state.

With contactless electric power supply device 1A of the second embodiment, face-to-face power supply section 6A includes open and close switches 26L and 26R in the circuits that connect alternating current power source 25 shared for the multiple supply coils 31 (31L and 31R) and the supply coils 31 (31L and 31R), and a face-to-face state detecting section that turns open and close switches 26L and 26R into a closed circuit state only when the face-to-face state is detected. In the second embodiment too, the timing of supply of the alternating current power supply supplied from alternating current power source 25 to supply coils 31L and 31R is the same as the first embodiment, as illustrated by FIGS. 5 to 10. Therefore, electric load 57 always operates stably. Accordingly, in the second embodiment too, a charging circuit and a battery are not required, and a small and light moving body 99 can be achieved.

6. Applications and Alternative Embodiments

Note that, while using supply-side capacitor 35 and receiving-side capacitor 45 as a resonance element, the frequencies of alternating current power sources 2 (2L and 2R) may be shifted from a resonance frequency. In this case, because the influence of changes in the resonance characteristics is curtailed, even if the absolute value of the receiving voltage is slightly lowered, the voltage variation is reduced. Accordingly, direct current power source circuit 55 can be omitted. Also, the quantity and arrangement positions of the sensors 61L, 61R, 62L, and 62R, and the quantity, length, and arrangement positions of dog 68 that configure the face-to-face state detecting section may be changed appropriately and still achieve the same functions and effects. Further, the contactless electric power supply method is not limited to electromagnetic coupling using supply coils 31 (31L and 31R) and receiving coils 41 (41L and 41R), for example, a static electric coupling method using supply electrodes and receiving electrodes may be used. Various other applications and modifications are possible for the present disclosure.

INDUSTRIAL APPLICABILITY

In addition to board production line 9 as described in the embodiments, a contactless electric power supply device of the present disclosure may be applied to a wide range of fields, such as assembly lines or processing lines for producing other products, and for supplying electric power to electric vehicles that are moving.

REFERENCE SIGNS LIST 1, 1A: contactless electric power supply device;
2, 2L, 2R: alternating current power source; 23L, 23R: power source switch; 25: alternating current power source; 26L, 26R: open and close switch;
31, 31L, 31R: supply coil (electric power supply element); 35: supply-side capacitor (resonance element);
41, 41L, 41R: receiving coil (electric power receiving element); 45: receiving-side capacitor (resonance element);
5: receiving circuit; 51: rectifier circuit; 55: direct current power source circuit;
6, 6A: face-to-face power supply section; 61L, 61R, 62L, 62R: sensor (face-to-face state detecting section); 68: dog (face-to-face state detecting section);
9: board production line (fixed section); 91 to 93: first to third board production machines; 99: moving body;
LT: length in moving direction of supply coil;
DT: distance separating supply coils from each other;
LR: length in moving direction of receiving coil;
DR: distance separating receiving coils from each other

The invention claimed is:

1. A board production line in which multiple board production machines are arranged in a line, comprising:
multiple electric power supply elements arranged in the board production machines and separated from each other along a moving direction of the board production line;
a guide rail which extends along a respective front of the board production machines in the moving direction; an alternating current power source configured to supply an alternating current individually to the multiple electric power supply elements;
a moving body configured to move along the guide rail in the moving direction, the moving body configured to supply materials to the board production machines; multiple electric power receiving elements provided on the moving body and arranged separated from each other along the moving direction, the electric power receiving elements configured to receive the alternating current in a contactless manner by being electrically coupled with one electric supply element of the multiple electric power supply elements of one board production machine that is positioned facing one of the electric power receiving elements; a receiving circuit in the moving body configured to convert the alternating current received by the multiple electric power receiving elements, generate a receiving voltage, and output the receiving voltage to an electric load provided on the moving body; and a face-to-face power supply section provided to each of the board production machines for each of the multiple electric power supply elements, and configured to detect a face-to-face state in which an entire length in the moving direction of at least one of the electric power receiving elements is encompassed by a length in the moving direction of the one electric power supply element, and supply the alternating current to the electric power supply element from the alternating current power source only when the face-to-face state is being detected, wherein a length in the moving direction of the multiple electric power supply elements and a distance by which the multiple electric power supply elements are separated from each other, and a length in the moving direction of the multiple electric power receiving elements and a distance by which the multiple electric power receiving elements are separated from each other are set such that face-to-face conditions, in which the face-to-face state is always occurring for at least one of the electric power receiving elements, the receiving circuit is configured to convert the alternating current received by the at least one electric power receiving element that is in the face-to-face state, and generate receiving voltage at least equal to a driving voltage required to drive the electric load, the face-to-face power supply section includes a face-to-face detecting section having at least two sensors, each of the at least two sensors including a light emitter configured to emit detection light and a light receiver configured to receive the detection light, a side surface of the moving body includes a dog configured to pass between the light emitter and the light receiver of at least one of the at least two sensors in order to block the light receiver of the one of the at least two sensors from receiving the detection light from the light emitter of the one of the at least two sensors, the face-to-face detecting section indicates the face-to-face state only when the dog blocks the light receivers of the at least two sensors from receiving the detection light and wherein the electrical load is a linear motor configured to move the moving body.

2. The board production line according to claim 1, wherein
in a case in which the length in the moving direction of the multiple electric power supply elements is LT, the distance separating the multiple electric power supply elements is DT, the length in the moving direction of the multiple electric power receiving elements is LR, and the distance separating the multiple electric power receiving elements is DR, the face-to-face conditions are represented by DT≤DR, and (2×LR+DR)≤LT.

3. The board production line according to claim 1, wherein the face-to-face power supply section includes
a power source switch configured to turn on and turn off the alternating current source provided for each of the electric power supply elements, or an open and close switch interposed in a circuit configured to connect the electric power supply element with the alternating current power source provided for shared use for the multiple electric power supply elements, and configured to close the circuit of the open and close switch or to turn on the power source switch only when the face-to-face state is detected.

4. The board production line according to claim 3, wherein
the at least one sensor is provided on the fixed section corresponding to the electric power supply element, and
the dog is a thin plate provided on the moving body corresponding to the multiple electric power receiving elements.

5. The board production line according to claim 4, wherein
the at least one sensor is arranged at a position shifted to the center from both ends in the moving direction of the electric power supply elements by the length in the moving direction of the electric power receiving elements, and the dog extends connecting respective far ends of the multiple electric power receiving elements that are separated from each other.

6. The board production line according to claim 1, further including
a resonance element configured to form a resonance circuit connected to at least one of the electric power supply elements and the electric power receiving elements, wherein
the receiving circuit includes
multiple rectifier circuits provided for each of the electric power receiving elements and configured to convert received alternating current electric power into the direct current receiving voltage and output the direct current receiving voltage, and
a direct current power source circuit configured to convert the direct current receiving voltage output by each of the rectifier circuits into the direct driving voltage.

7. The board production line according to claim 1, wherein
the electric power receiving element is a receiving coil and the electric power supply element is a supply coil.

8. The board production line according to claim 1, wherein
the multiple electric power supply elements are arranged in a quantity that is the same as a quantity of the multiple board production machines.

* * * * *